United States Patent
Capurso et al.

(10) Patent No.: US 6,908,033 B2
(45) Date of Patent: *Jun. 21, 2005

(54) HAND-HELD PROGRAMMER FOR PROGRAMMABLE LIQUID CRYSTAL DISPLAY

(75) Inventors: Robert G. Capurso, Bergen, NY (US);
James M. Papa, Rochester, NY (US);
Stanley W. Stephenson, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 54 days.

This patent is subject to a terminal disclaimer.

(21) Appl. No.: 10/178,979

(22) Filed: Jun. 25, 2002

(65) Prior Publication Data

US 2003/0234775 A1 Dec. 25, 2003

(51) Int. Cl.⁷ .............................................. G06K 15/00
(52) U.S. Cl. ...................................... 235/383; 340/5.91
(58) Field of Search ................................ 235/383, 385, 235/441, 439, 487, 462.01, 472.01, 472.02; 340/5.91, 10.6; 428/42.1; 705/20, 400; 345/50–51

(56) References Cited

U.S. PATENT DOCUMENTS

| | | | | |
|---|---|---|---|---|
| 4,041,537 A | * | 8/1977 | Kishi | 360/60 |
| 5,111,196 A | | 5/1992 | Hunt | 340/5.91 |
| 5,216,233 A | * | 6/1993 | Main et al. | 235/462.41 |
| 5,335,170 A | * | 8/1994 | Petteruti et al. | 705/28 |
| 5,751,257 A | | 5/1998 | Sutherland | |
| 5,861,817 A | * | 1/1999 | Palmer et al. | 340/5.91 |
| 5,880,449 A | * | 3/1999 | Teicher et al. | 235/383 |
| 6,217,966 B1 | * | 4/2001 | Finster et al. | 428/42.1 |
| 6,253,190 B1 | | 6/2001 | Sutherland | |
| 6,269,342 B1 | * | 7/2001 | Brick et al. | 705/20 |
| 6,550,673 B2 | * | 4/2003 | Massaro | 235/383 |
| 6,570,492 B1 | * | 5/2003 | Peratoner | 340/310.01 |
| 6,637,650 B1 | * | 10/2003 | Capurso et al. | 235/383 |
| 2003/0202136 A1 | * | 10/2003 | Stephenson et al. | 349/86 |

OTHER PUBLICATIONS

U.S. Appl. No. 10/134,185, filed Apr. 29, 2002, by Stephenson et al.

* cited by examiner

Primary Examiner—Diane I. Lee
(74) Attorney, Agent, or Firm—Kathleen Neuner Manne

(57) ABSTRACT

A method of writing an electrically writable tag using a hand-held writing device includes the steps of providing an electrically writable tag having a plurality of electrical conductors located on a display surface of the tag, and a mechanical alignment feature including a detent for locating the tag with respect to a hand-held writing device; providing a hand-held writing device having a corresponding plurality of electrical contacts for simultaneously making contact with the electrical conductors of the tag, and a complementary alignment feature with a detent for locating the hand-held writing device with respect to the tag; and locating the hand-held writing device with respect to the tag, using the alignment features, and activating the hand-held writing device to write information on the tag.

28 Claims, 10 Drawing Sheets

HAND-HELD PROGRAMMER FOR PROGRAMMABLE LIQUID CRYSTAL DISPLAY

FIELD OF THE INVENTION

The present invention relates to a structure having a flexible display with front electrical contacts to the display.

BACKGROUND OF THE INVENTION

U.S. Pat. No. 5,751,257 issued May 12, 1998, and U.S. Pat. No. 6,253,190 issued Jun. 26, 2001, both to Sutherland show a system including a programmable shelf tag having a bistable liquid crystal display for displaying price data and a Universal Product Code (UPC) bar code, wherein the information programmed in the display remains on the display in the absence of power. The shelf tag has a set of synchronizing indicators and corresponding electrical contacts on the frontside of the display.

The shelf tag is programmable with a hand-held device that is connected to a central computer that contains inventory and price information. The hand-held device can be used to scan the synchronizing indicators to identify the location of the electrical contacts and supplies the electrical contacts with electrical signals to write appropriate information on the shelf tag. For inventory control and price updates, the hand-held device is used to first read the UPC bar code on the shelf tag. If a price needs to be updated, the hand-held device is then used to write the appropriate price information into the tag. The hand-held device is placed into contact with the shelf tag and is moved across the tag to sequentially make contact with each of the contacts on the front side of the display. A timing track is included on the front side of the display. The hand-held device reads the timing track optically and synchronizes the signal supplied to the respective contacts as the hand-held device is moved across the display. The display includes an alignment groove and the hand-held device includes a probe that is located in the alignment groove to position the contacts of the hand-held device relative to the contacts of the display.

One problem with the system as described by Sutherland is that including the UPC as a writable element on the shelf tag, significantly increases the complexity and cost of the shelf tag. The resolution needed to produce UPC information requires 113 modules of data, and therefore requires at least a corresponding number of contacts on the front of the display.

Another problem is that the hand-held device must be translated in a preferred direction (e.g. right to left) and within a preferred translation rate to properly program the display. Yet another problem is that translating the hand-held device across the contacts tends to wear out the contacts of the hand-held device and the shelf tag over time, necessitating replacement or repair of the contacts. A further problem with the method and apparatus disclosed by Sutherland is that the electronics of the hand-held device are complicated by the need to sequentially address the contacts of the display.

There is a need therefore for an improved writable display tag and hand-held programming device that avoids the problems noted above.

SUMMARY OF THE INVENTION

The need is met according to the present invention by a method and apparatus that includes an electrically writable tag having a plurality of electrical conductors located on a display surface of the tag, and a mechanical alignment feature including a detent for locating the tag with respect to a hand-held writing device; and a hand-held writing device having a corresponding plurality of electrical contacts for simultaneously making contact with the electrical conductors of the tag, and a complementary alignment feature with a detent for locating the hand-held writing device with respect to the tag. The hand-held writing device is located with respect to the tag, using the alignment features and activated to write information on the tag.

ADVANTAGES

The electrically writable tag and writing device of the present invention has the advantage that the writing device cooperates with the tag to make precise simultaneous alignment with all of the electrical contacts of the writable tag.

DETAILED DESCRIPTION OF THE INVENTION

Figure 1:
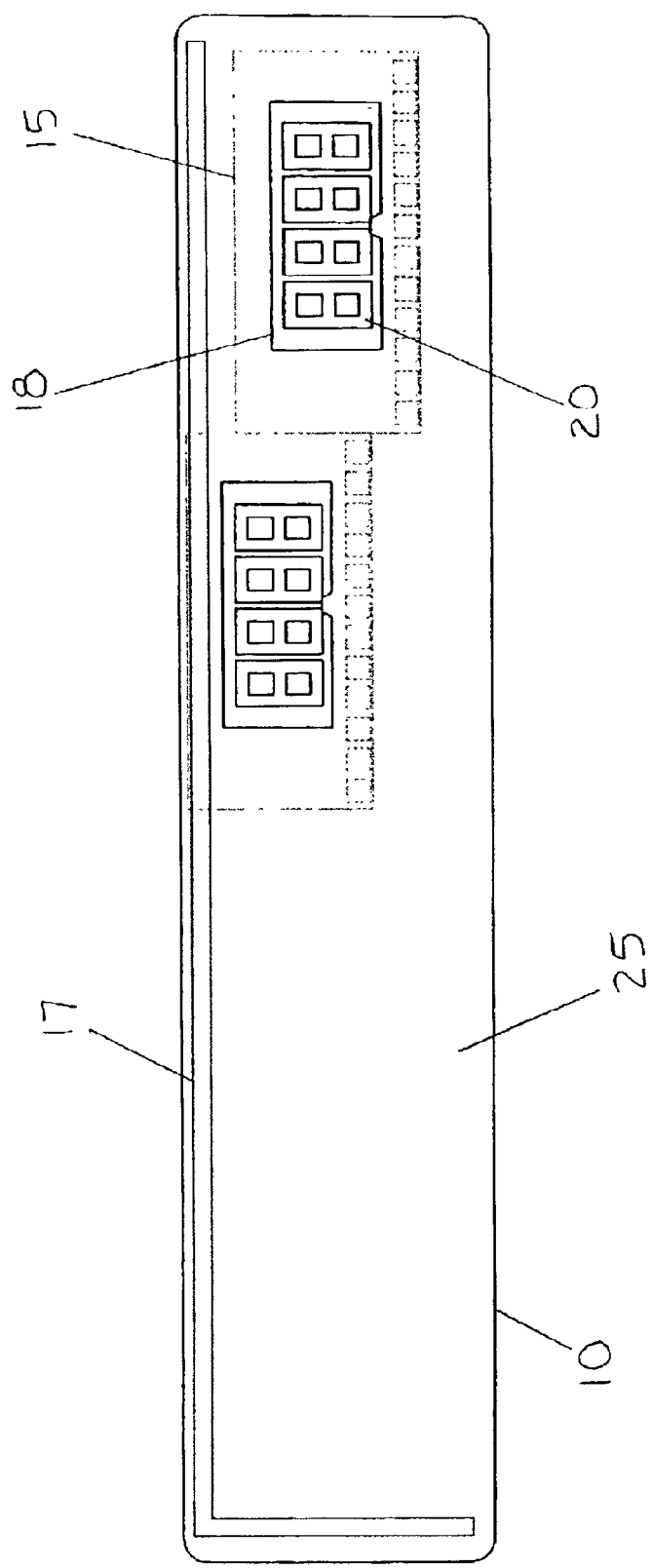
FIG. 1 shows a front view of a label having a display element used with the present invention.

Referring to FIG. 1, a label 10 includes one or more electronically writable display elements 15 constructed by forming a plurality of common conductive character electrodes on a substrate; coating and drying a liquid crystal gelatin dispersion over the common character electrodes, and printing conductive character elements over the common character electrodes. The display elements are mounted in windows 18 cut into a sheet of adhesive print medium having a printable surface 25. The label is preferably made as shown in U.S. Ser. No. 10/134,185 filed Apr. 29, 2002 by Stephenson et al., which is incorporated herein by reference.

The perforated windows 18 allow character elements 20 on displays 15 to be viewed from the front printable side 25 of the label 10. Printable surface 25 allows the addition of static readable information such as bar code and item description to be applied by a printer such as an ink jet printer.

Figure 2:
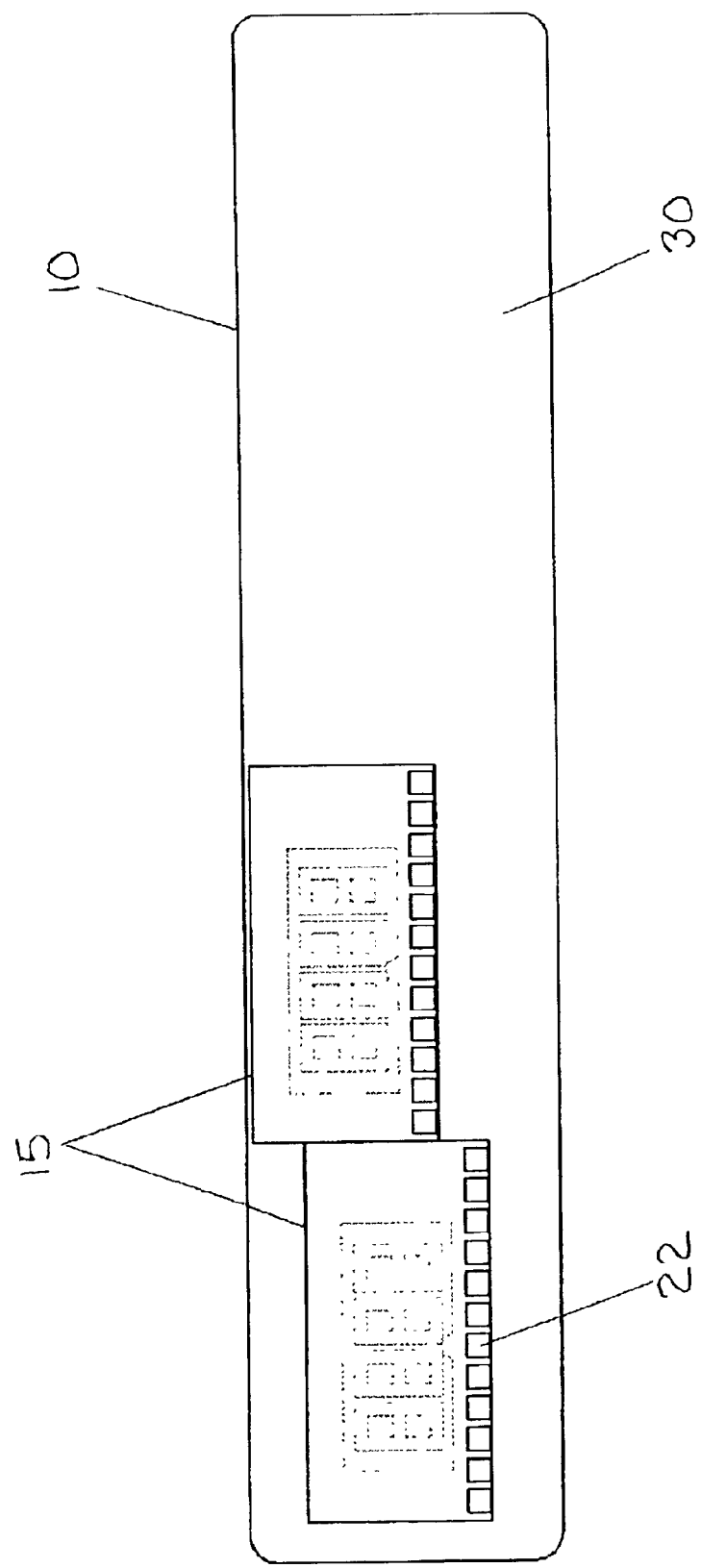
FIG. 2 is a back view of the label shown in FIG. 1.

The reverse side of label 10 shown in FIG. 2 has an adhesive backing 30 to allow attachment to a support body 35 as well as attachment of the display elements 15 to the back side of the label 10. Display elements 15 are attached to adhesive backing 30 to expose electrically conductive pads 22 on the back side of display elements 15. The adhesive backing is covered with a removable liner until the tag is assembled. Prior to assembly, the printable surface 25 has information printed on it, for example, by an ink jet printer.

Figure 3:
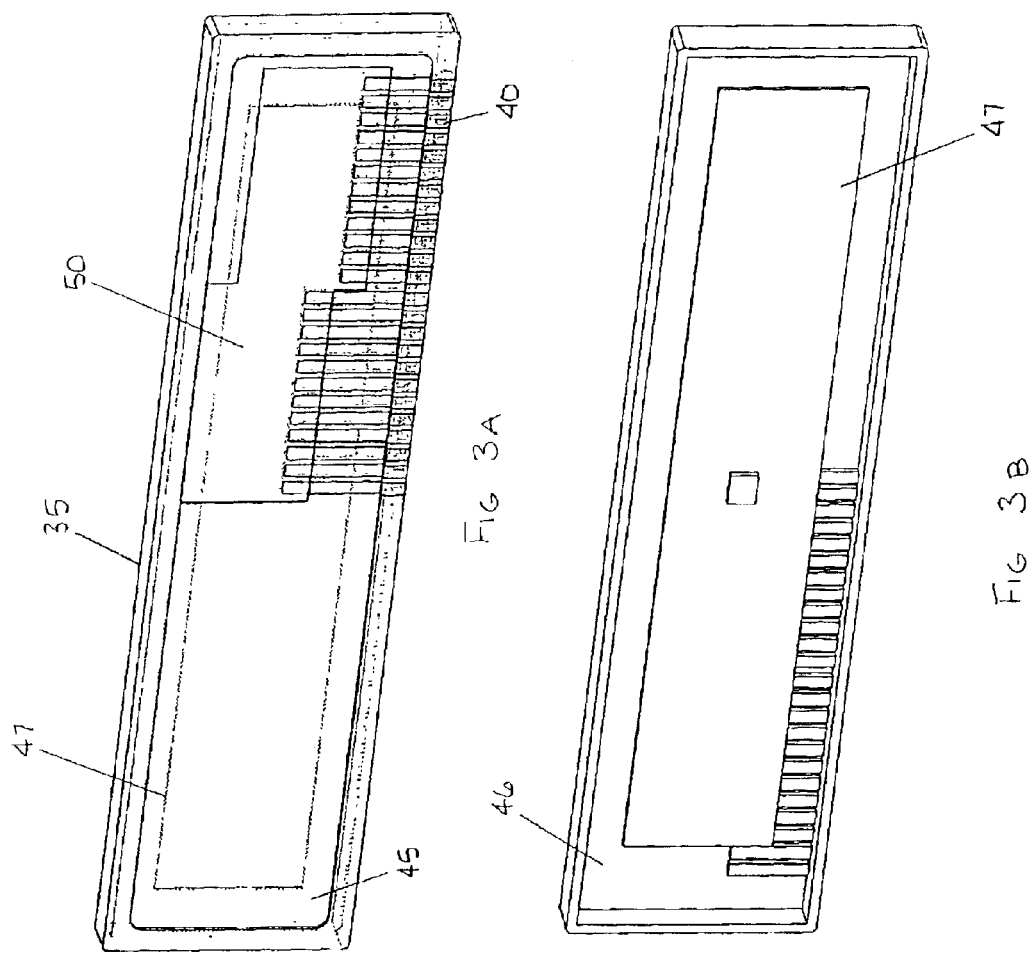
FIG. 3A is a front perspective view of a support body for receiving the label shown in FIG. 1.
FIG. 3B is a rear perspective view of the support body of FIG. 3A showing placement of an RFID transponder.
Figure 5:
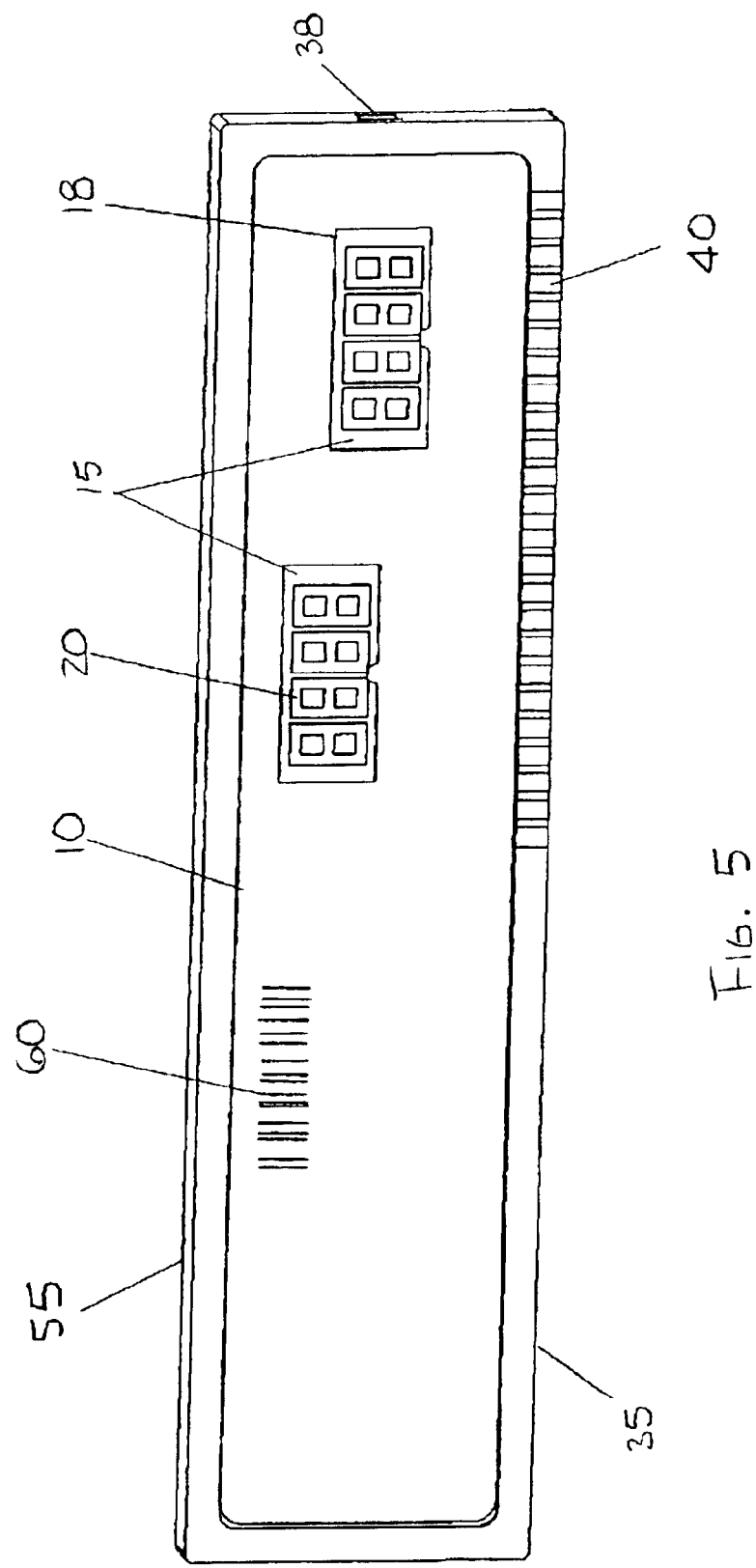
FIG. 5 is a front view of a completed display tag assembly used with the present invention.

FIG. 3A shows a front perspective view of a support body 35 having conductive strips 40 imbedded within it. A recess 45 positions label 10 on the support body 35 to form a display tag assembly as shown in FIG. 5. Recesses 50 in support body 35 provide clearance for the display elements 15 to allow the label 10 to lay flat on support body 35. Support body 35 is manufactured, for example, by injection molding plastic with conductive inserts to provide the conductive strips. Alternatively, the support body can be formed and the conductive strips applied subsequently. The display tag assembly may also include an RFID (radio frequency ID) transponder. FIG. 3B is a back view of the support body 35 showing a recess 46 for locating the RFID transponder 47 on the back of the support body 35.

Figure 4:
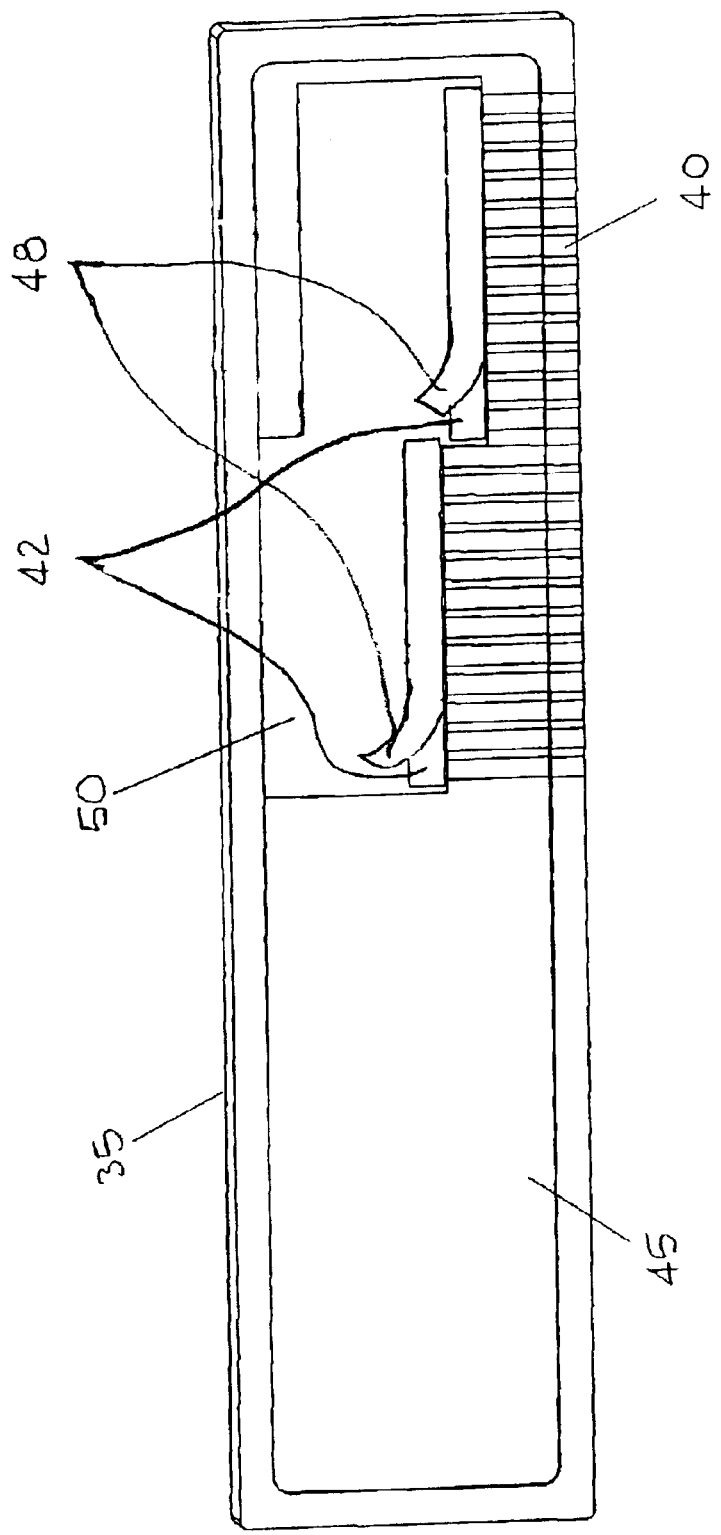
FIG. 4 is a perspective view of the support body with anisotropic conductive tape strips with adhesive backer liner positioned over the conductive strips.

Referring to FIG. 4, electrical connection is provided between the conductive pads 22 on the display elements 15 and the conductive strips 40 in the support body 35 by anisotropically conductive adhesive strips 42 having a removable a backer liner 48 (shown partially removed). For assembly, the backer liner of the conductive adhesive strips 42 is removed, the releasable liner is removed from the back of the label 10, and the label 10 is inserted into the recess 45 of the support body 35.

FIG. 5 shows an assembled display tag assembly 55 with a label 10 adhered to the support body 35. The character elements 20 on the display element 15 show through cut-out windows 18 in the label 10. The conductive strips 40 are exposed along the bottom edge of the support body 35 allowing electrical contacts to be made between a hand-held writing device and the display elements 15. The conductive strips 40 in turn contact the conductive pads 22 on the reverse side of the display elements 15 by way of the anisotropic conductive adhesive 42 thus enabling the state of the character elements 20 to be changed by applying a suitable electrical signal to the conductive strips 40.

One element of information, which can be printed on the label, is a UPC bar code 60 Generally, the UPC bar code for a product is static and does not change for the life of the product. It therefore can be practically printed on the label 10, as opposed to including it in the writable display portion of the label. A Universal Product Code Identification Number may also be stored in the RFID transponder 47. Other information, such as the designation "price" and "price per unit" is normally printed adjacent the display elements, and a product description is normally printed on the label. An image of the product can also be printed on the label as disclosed in U.S. Patent Application No. (Stephenson shelf tag with image application), which is incorporated herein by reference.

Figure 6:
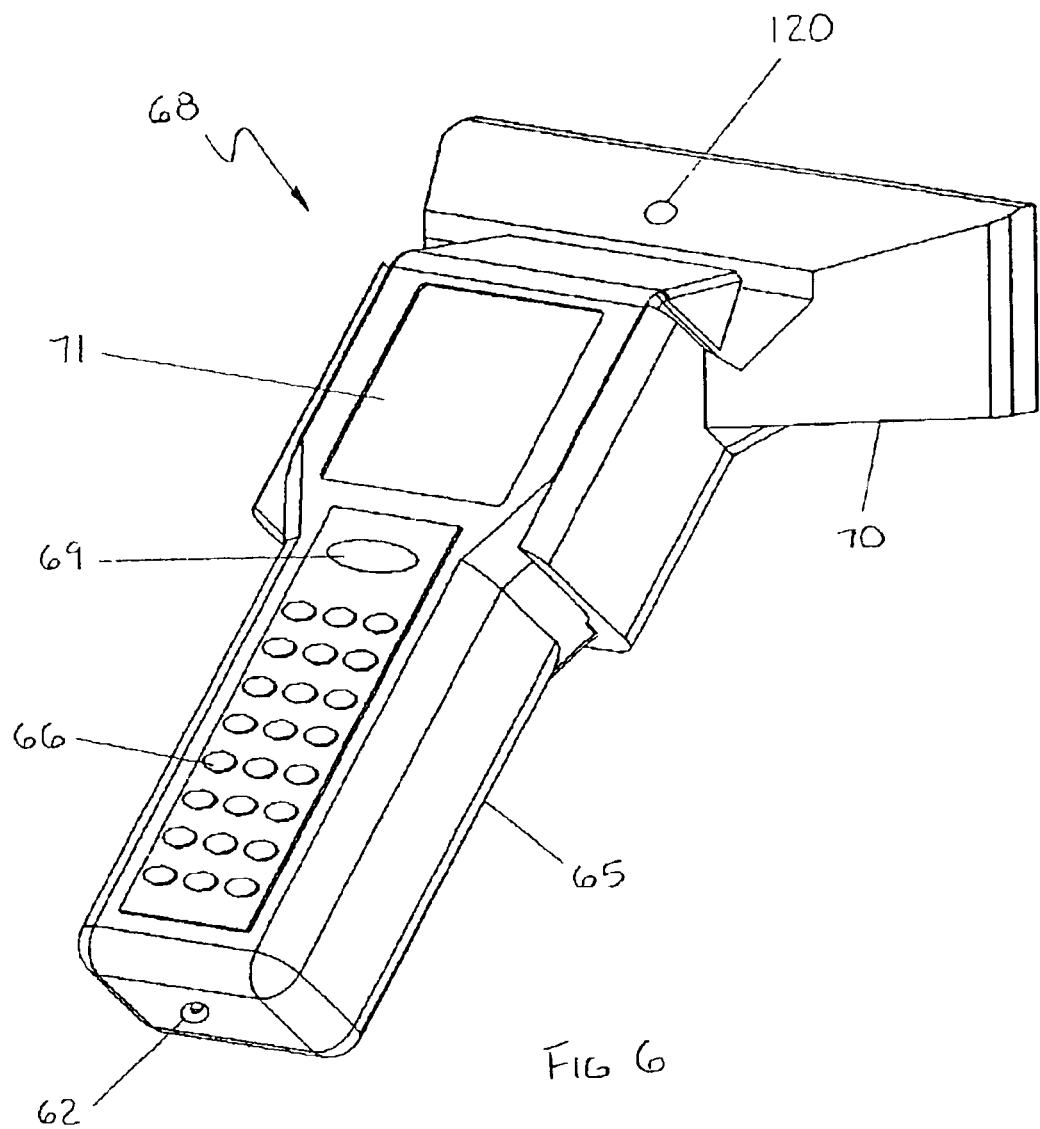
FIG. 6 is a perspective front view of a hand-held writing device used with the present invention.

Referring to FIG. 6, a hand-held writing device 68 for writing information on the electronically writable display elements 15 includes a standard bar code/RFID transceiver hand-held terminal 65, such as an Opticon Model PHL 2700™ (Opticon Inc., Orangeburg N.Y.) and a shelf tag writing head 70, which includes a means of precisely locating the writing head 70 with respect to the support body 35 of the electronically writable tag 55. The hand-held terminal includes a communication port 62, such as a standard RS 232 port for communicating with a processing and control circuit in the hand-held terminal 65. The hand-held terminal includes a plurality of operator interface buttons 66, a main trigger switch 69, and a display screen 71. The functions of the interface buttons and trigger switch, and the information displayed on display screen are all programmable by a user.

Figure 7:
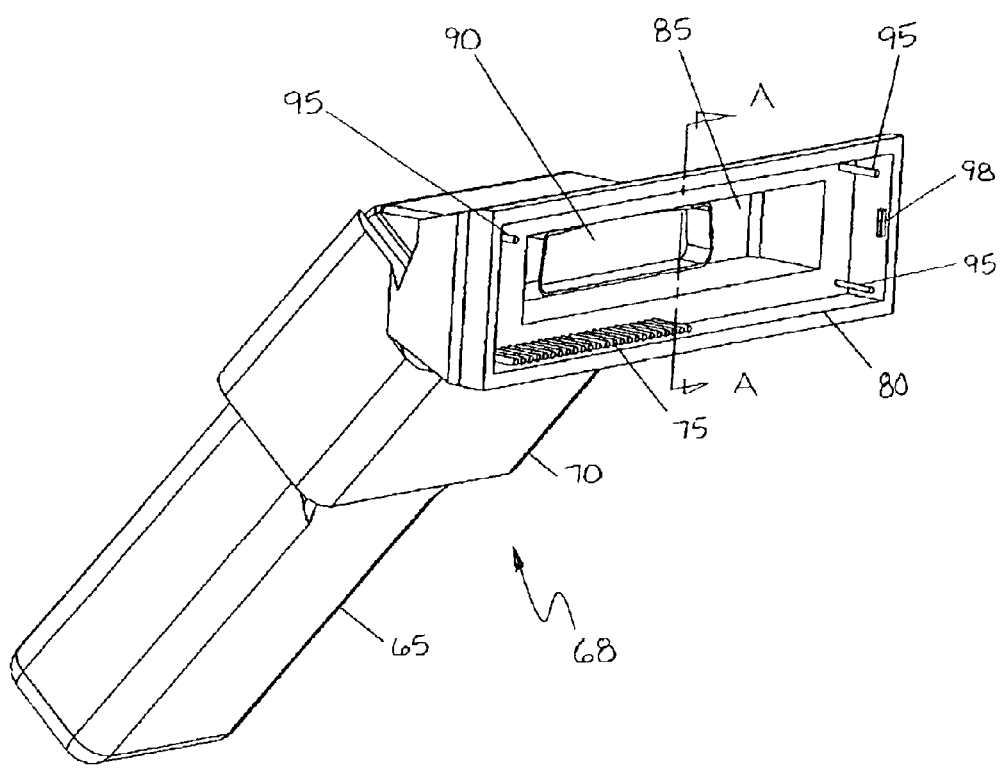
FIG. 7 is a perspective back view of the hand-held writing device shown in FIG. 6.

Referring to FIG. 7, the back of the hand-held writing device 68 is shown. A plurality of contact pins 75 are arranged in the write head 70 to contact the contact strips 40 on support body 35 when the write head 70 is located over the shelf tag 55. The hand-held terminal 65 includes a bar code scanner 92 and an RFID transceiver 93 (shown in FIG. 10) having a scanning window 90 located in an opening 85 in the write head 70 for allowing the scanner to view the bar code 60 on the label 10. An alignment feature, such as a precision opening 80 in the write head 70 is used to locate the write head about the support body 35 to precisely align the contact pins 75 to the conductive strips 40 on support body 35. Detent bumps 98 are molded into the write head 70 and are adapted to snap into recesses 38 (see FIG. 5) in support body 35 to ensure proper engagement. The use of an RFID transceiver allows the option of reading of a Universal Product Code Identification Number without having to precisely aim the hand-held terminal as one has to when using the bar code scanner feature. Also the RFID transponder allows other programmable information to be stored locally on the display tag assembly 55. The RFID label receives all wireless communication and power from the hand-held terminal.

An electrical feature, such as an electrical conductor 17 (see FIG. 1) is provided on the in the display tag assembly 55 that can be sensed to determine that the write head is properly aligned with the display tag assembly 55 can also be provided. Sensor pins 95 may be provided in the write head to make contact with the conductor 17 to provide feedback to indicate to a user that the write head is properly aligned with the tag. The indication may be provided via the display screen 71. Alternatively, an indicator 120 (see FIG. 6) may be provided on the write head 70. This indicator may emit sound or light to indicate that proper alignment is achieved.

Figure 8:
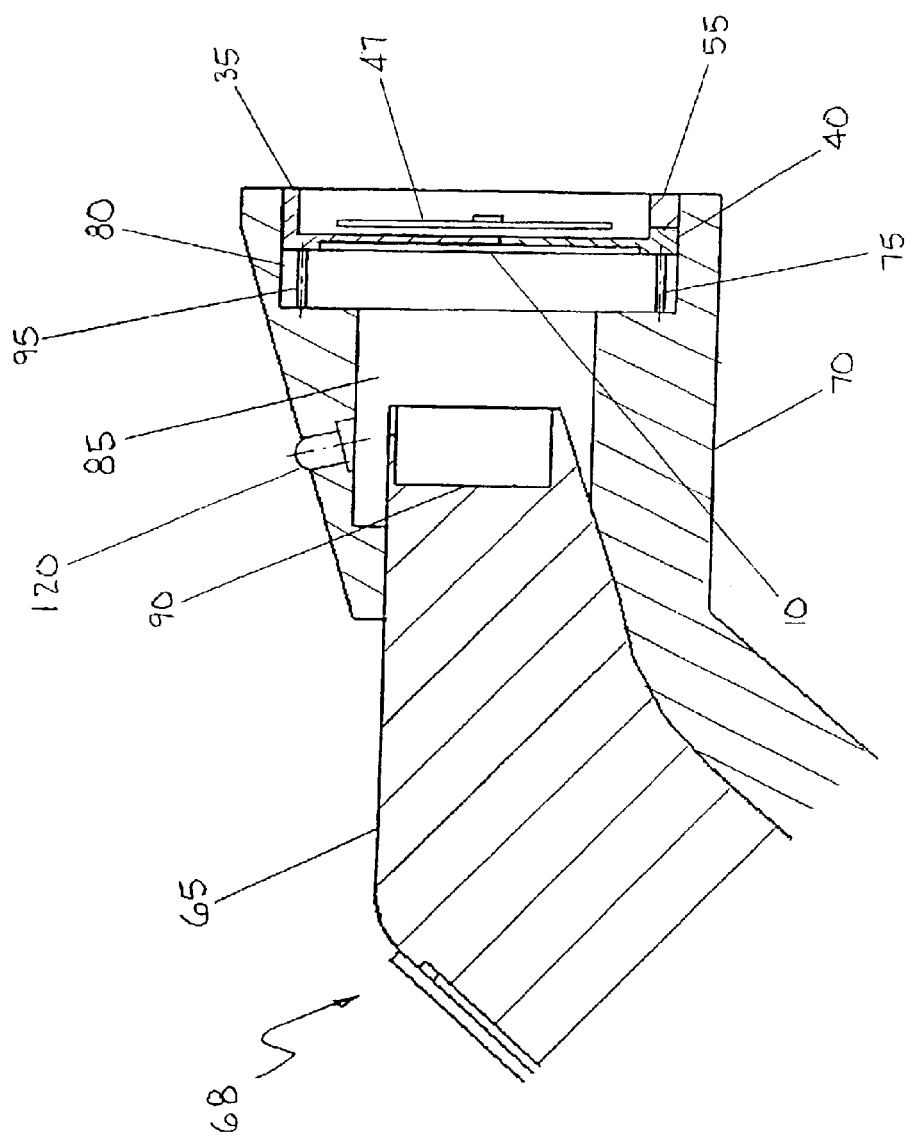
FIG. 8 is a partial sectional view of the hand-held writing device of FIG. 7 taken along line A—A.

Referring to FIG. 8, a partial cross sectional view of the hand-held terminal 65, the write head 70, and the tag 55 shows the write head 70 located in writing position over electronically writable tag 55. The indicator 120 provides a visual or audible response when sensor pins 95 are in contact with the conductor 17 in display tag assembly 55.

Figure 9:
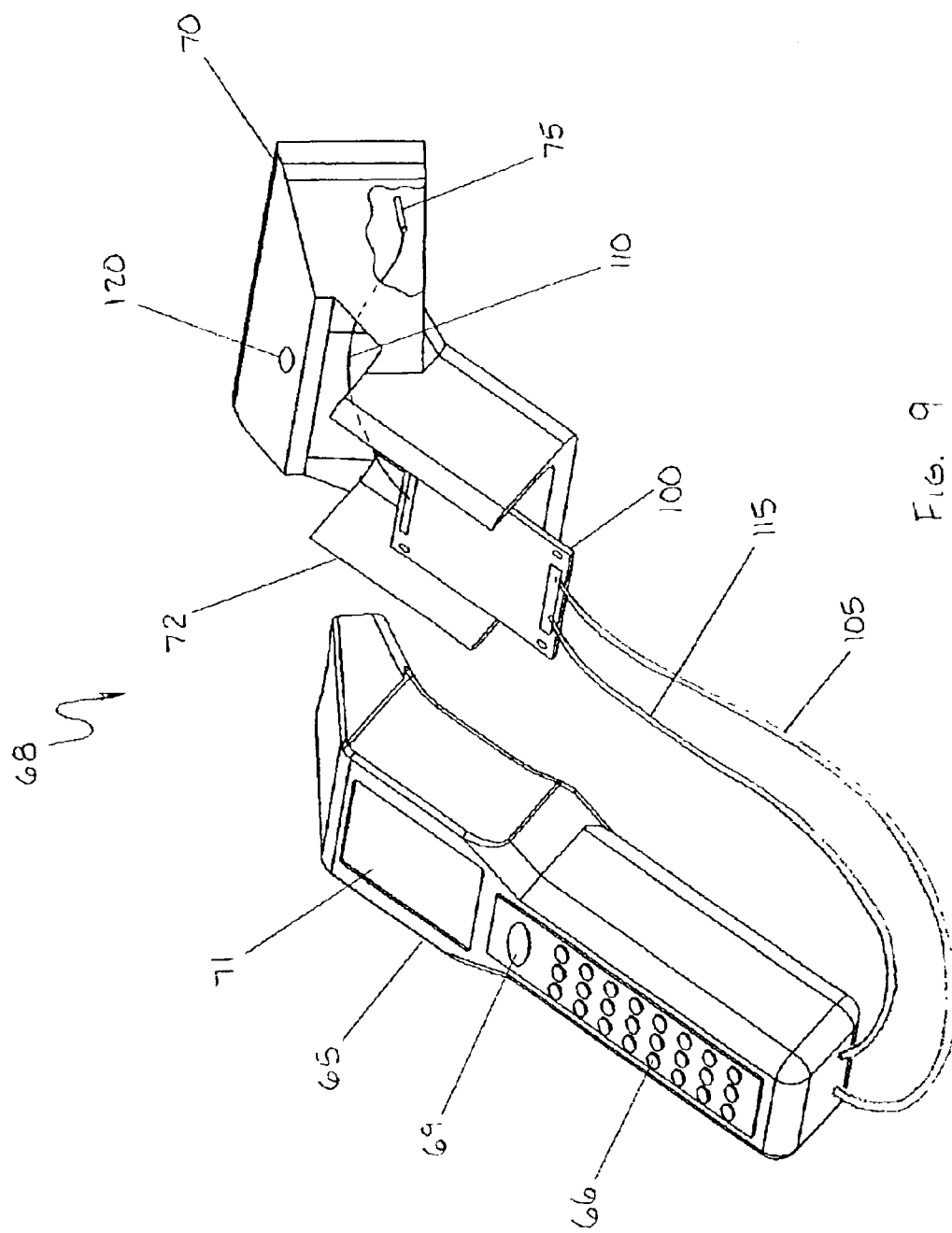
FIG. 9 is an exploded perspective view of one embodiment of a hand-held writing device according to the present invention.

The hand-held writing device 68 can be manufactured as a single unit, or as shown in FIG. 9 it can comprise a standard commercially available hand-held terminal 65, and an attachable write head 70. The write head 70 is provided with a circuit board with drive electronics 100, power cable 105, communication cable 115, a plurality of contact pins 75, wiring 110 for pins 75, and a mechanical attachment interface 72 for releasably attaching the write head 70 to the hand-held terminal 65.

Figure 10:
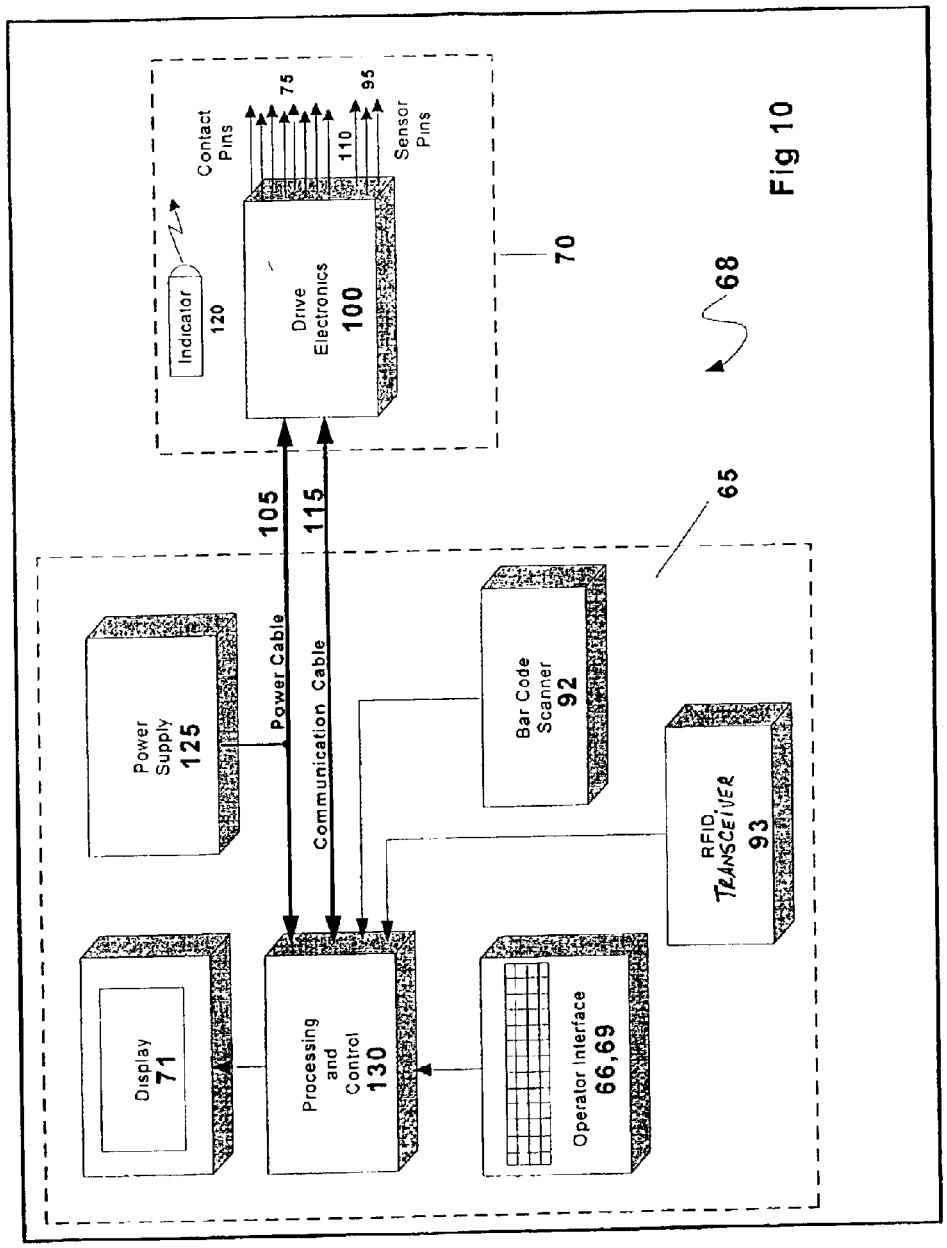
FIG. 10 is a functional block diagram of the hand-held writing device.

Referring to FIG. 10 the hand-held writing device includes a central processing and control circuit 130, operator interface 66, 69, a display 71, a power supply 125, a bar code scanner 92, an RFID transceiver 93, and drive electronics 100 for the write head. For the embodiment where the write head 70 is an attachment to an off the shelf hand-held terminal 65, the location of the components is indicated by dashed lines.

The invention has been described in detail with particular reference to certain preferred embodiments thereof, but it

PARTS LIST 10 label
15 display element
17 electrical conductor
18 perforated window
20 character elements
22 conductive pads
25 printable surface
30 adhesive backing
35 support body
38 detent recess
40 conductive strips
42 conductive adhesive strips
45 recess in support body
46 recess in support body
47 RFID transponder
48 backer liner
50 display recess
55 display tag assembly
60 UPC printed bar code
62 communication port
65 hand-held terminal
66 input buttons
68 hand-held writing device
69 main trigger button
70 write head
71 display screen
72 mechanical attachment interface
75 contact pins
80 precision opening
85 opening for scanner
90 scanning window
92 bar code scanner
93 RFID transceiver
95 sensor pins
98 detent bumps
100 circuit board with drive electronics
105 power cable
110 wiring to pins
115 communications cable
120 indicator
125 power supply
130 processing and control circuit

What is claimed is:

1. A method of writing an electrically writable tag using a hand-held writing device, comprising the steps of:
 a) providing an electrically writable tag having: a display element having a single flexible transparent substrate, one or more first transparent conductors located on the substrate, a layer of polymer dispersed material located over the first conductor(s), the polymer dispersed material being responsive to an applied electric field for displaying information and having first and second optical states that are both stable in the absence of an electrical field, one or more second conductors located over the polymer dispersed layer for applying the electric field to the polymer dispersed material between the first and second conductors and a plurality of display contacts located on the backside of the display for making electrical connection to the first and second conductors of the display, and a sheet of adhesive print medium having a die cut label area, and defining a window in the label area, the display element being mounted substrate side down in the window; a plurality of electrical conductors located on a display surface of the tag; and a mechanical alignment feature including a detent for locating the tag with respect to a hand-held writing device;
 b) providing a single hand-held writing device comprising a corresponding plurality of electrical contacts for simultaneously making contact with the electrical conductors of the tag, a bar code scanner, and a complementary alignment feature with a detent for locating the hand-held writing device with respect to the tag; and
 c) locating the hand-held writing device with respect to the tag, using the alignment features, and activating the hand-held writing device to write information on the tag.

2. The method claimed in claim 1, wherein the tag includes an electrical feature that can be sensed by the hand-held writing device for providing an indication that the hand-held writing device is in proper alignment with the conductors of the tag; and the hand-held writing device includes a sensor for sensing the electrical alignment feature, and an indicator responsive to the sensor for indicating the proper alignment of the hand-held writing device with the tag, and farther including the step of verifying that the hand-held writing device is in proper alignment with the tag before activating the hand-held writing device.

3. The method claimed in claim 2, wherein the electrical feature in the tag is a conductor extending across the tag and wherein the sensor in the hand-held device is a spaced apart pair of contacts for making electrical contact with the conductor.

4. The method claimed in claim 1, wherein the alignment features are a peripheral frame on the tag and a mating frame on the hand-held writing device.

5. The method claimed in claim 4, wherein the detents are a recess and a raised bump on the frames.

6. The method claimed in claim 1, wherein the tag includes:
 a body having a surface for receiving the display element, the body defining alignment features for precisely locating the display element on the surface, contacts on the body having exposed portions on the surface and located with respect to the alignment feature for making electrical connection to the first and second conductors of the display element and exposed portions that extend beyond the display element, whereby the first and second conductors are electrically addressable from the front side of the shelf tag label; and
 b) conductive adhesive located over the exposed portions of the contacts on the receiving surface.

7. The method claimed in claim 1, wherein the electrically writable tag is a shelf label and the electrically written displayed information is price.

8. The method claimed in claim 1, further including the step of printing static information on the electrically writable tag.

9. The method claimed in claim 8, wherein the static information includes an image of a product.

10. The method claimed in claim 8, wherein the static information includes information from the group comprising a UPC, a product description, and a unit description.

11. The method claimed in claim 1, wherein the tag includes an RFID transponder, and the hand held-writing device includes an RFID transceiver.

12. The method claimed in claim 11, wherein the RFID transponder contains a Universal Product Code Identification Number and the RFID transceiver reads the Universal Product Code Identification Number from the RFID transponder.

13. A display tag assembly, comprising:
 a) programmable label, having:
  i) a display element having a single flexible transparent substrate, one or more first transparent conductors located on the substrate, a layer of polymer dispersed material located over the first conductor(s), the polymer dispersed material being responsive to an applied electric field for displaying information and having first and second optical states that are both stable in the absence of an electrical field, one or more second conductors located over the polymer dispersed layer for applying the electric field to the polymer dispersed material between the first and second conductors and a plurality of display contacts located on the backside of the display for making electrical connection to the first and second conductors of the display; and ii) a sheet of adhesive print medium having a die cut label area, and defining a window in the label area, the display element being mounted substrate side down in the window, and including a releasable backing layer, whereby static information can be printed on the label and the printed label can be removed from the backing layer and attached to a support having contacts for making electrical connection to the conductors of the display element; and b) a support for receiving the label having:
i) a body having a surface for receiving the label, the body defining a mechanical alignment feature including a detent for locating the tag with respect to a hand-held writing device;
ii) contacts on the body having exposed portions on the surface and located with respect to the alignment feature for making electrical connection to the first and second conductors of the display element and exposed portions that extend beyond the display element, whereby the first and second conductors are electrically addressable from the front side of the display tag assembly;
iii) conductive adhesive located over the exposed portions of the contacts on the receiving surface; and
iv) an electrical feature that can be sensed by the hand-held writing device for providing an indication that the hand-held writing device is in proper alignment with the conductors of the tag.

14. The display tag assembly claimed in claim 13, wherein the electrical feature in the tag is a conductor extending across the tag that is adapted to be contacted by a spaced apart pair of contacts in the hand-held device.

15. The display tag assembly claimed in claim 13, wherein the alignment features are a peripheral frame on the tag and a mating frame on the hand-held writing device.

16. The display tag assembly claimed in claim 13, wherein the detents are a recess and a raised bump on the frames.

17. The display tag assembly claimed in claim 13, wherein the static information is an image of a product on the adhesive label.

18. The display tag assembly claimed in claim 13, wherein comprising a second display element mounted in a second window formed in the adhesive label, and wherein the support includes conductors for providing contact to the second display element.

19. The display tag assembly claimed in claim 13, wherein the static information includes information from the group comprising a UPC, a product description, and a unit description.

20. The display tag assembly claimed in claim 13, wherein the adhesive print media is inkjet print paper.

21. The display tag assembly claimed in claim 13, wherein the conductive adhesive is an anisotropic adhesive.

22. The display tag assembly claimed in claim 13, wherein the support further comprises an attachment feature for attaching the support to an existing shelf label bracket.

23. The display tag assembly claimed in claim 13, wherein the contacts are printed circuits on the body.

24. The display tag assembly claimed in claim 13, wherein the body is an injection molded plastic part and the contacts are conductive plastic molded in the body.

25. The display tag assembly claimed in claim 13, wherein the body is an injection molded plastic part and the contacts are metal conductors molded into the body.

26. The display tag assembly claimed in claim 13, wherein the contacts are a conductive applique.

27. The display tag assembly claimed in claim 13, further comprising an RFID transponder that can be programmed and sensed by the hand-held writing device.

28. The display tag claimed in claim 27, wherein the RFID transponder contains a Universal Product Code Identification Number.

* * * * *